United States Patent [19]
Agnoff

[11] Patent Number: 5,442,248
[45] Date of Patent: Aug. 15, 1995

[54] MOTORIZED PULLEY WITH INTEGRAL ELECTRICAL CONNECTOR

[75] Inventor: Charles Agnoff, Wilmington, N.C.

[73] Assignee: Interroll Holding, A.G., San Antonio, Switzerland

[21] Appl. No.: 225,804

[22] Filed: Apr. 11, 1994

[51] Int. Cl.6 .................. H02K 11/00; H02K 7/10
[52] U.S. Cl. ................................ 310/71; 310/67 R
[58] Field of Search ............... 310/67 R, 71; 439/733, 439/736, 675, 678, 873

[56] References Cited

U.S. PATENT DOCUMENTS

| | | | |
|---|---|---|---|
| 1,881,267 | 10/1932 | Drexler | 310/67 R |
| 2,858,085 | 10/1958 | Strang | 310/67 R |
| 2,997,608 | 8/1961 | Musser | 310/67 R |
| 3,056,054 | 9/1962 | Christian | 310/67 R |
| 4,043,630 | 8/1977 | Suverison et al. | |
| 5,113,101 | 5/1992 | Liu et al. | 310/71 |
| 5,158,479 | 10/1992 | Mouissie | 439/733 |
| 5,169,341 | 12/1992 | Nakata et al. | 439/607 |

FOREIGN PATENT DOCUMENTS

| | | | |
|---|---|---|---|
| 1548609 | 10/1968 | France | 439/736 |
| 1110698 | 7/1961 | Germany | 310/71 |
| 1192584 | 5/1965 | Germany | 310/71 |
| 1341700 | 9/1987 | U.S.S.R. | 310/71 |

*Primary Examiner*—Clayton E. LaBalle
*Attorney, Agent, or Firm*—Rhodes, Coats & Bennett

[57] ABSTRACT

A motorized pulley or roller comprises a stationary roller shaft, a generally cylindrical drum mounted for rotation about the roller shaft, and an electric drive assembly disposed inside the cylindrical drum for rotating the drum about the roller shaft. The motorized pulley includes an integral electrical connector for connecting the roller to a power supply. The integral electrical connector includes a male connector disposed in a recess formed in one end of the roller shaft. A female connector which registers with the male connector is wired to the power supply. The male and female connectors allow for easy and quick replacement of the motorized rollers by untrained personnel.

15 Claims, 4 Drawing Sheets

MOTORIZED PULLEY WITH INTEGRAL ELECTRICAL CONNECTOR

BACKGROUND OF THE INVENTION

The present invention relates generally to a motorized pulley or roller for a conveyor, and more particularly, to a motorized pulley having an integral electrical connector.

Motorized pulleys and rollers are commonly used in material handing equipment including conveyors, packaging machines, check-out counters, and cargo handling equipment. Motorized pulleys typically comprise a roller having an internal, electrically-powered motor and gear assembly. Power for the internal motor is provided either by a terminal box at one end of the roller shaft, or by a cable which exists through the end of the roller shaft.

The electrical connecting systems used in the past have a number of drawbacks. The terminal boxes used are cumbersome and require a relatively large amount of space. Frequently, the terminal boxes are inaccessible once installed making it difficult to make repairs or replacements. The inaccesssibility of the terminal boxes in their final mounted position may also require prewiring of the terminal boxes prior to installation. Terminal boxes also increase the cost of the motorized pulley.

Motorized pulleys having cables that extend through the end of the shaft also have some disadvantages. Normally, approximately 3–6 foot of cable extends from the end of the roller. The cable which is exposed during manufacture, transit and installation can be easily damaged. Further, prewiring of the final product is not possible because the cable must be routed at the final assembly. Finally, replacement of rollers having exposed cables requires skilled personnel to make the required electrical connections.

Accordingly, there is a need for a relatively simple and convenient method for electrically connecting motorized pulleys and rollers with a power source.

SUMMARY AND OBJECTS OF THE INVENTION

The present invention is a motorized pulley or roller having an integral electrical connector for connecting the roller to the power source. The roller comprises a generally cylindrical drum which is rotatably mounted on a stationary roller shaft. An electric motor and gear assembly is disposed inside the cylindrical drum and is mounted to the roller shaft for rotating the drum about the roller shaft. A recess is formed in one end of the roller shaft which houses an integral male connector. A female connector is connected to a power source and is adapted to mate with the male connector to provide power to the motorized roller. The shape of the female connector provides polarization so that only one connection is possible.

The motorized roller of the present invention has numerous advantages over prior art rollers. First, the integral connector simplifies assembly and allows for quick and easy replacement of rollers. The female connector simply plugs into the integral male connector in the end of the roller shaft. The connector allows rollers to be replaced by unskilled personnel. Thus, the design of the roller reduces the time needed for assembly of material handling equipment and the labor costs associated with assembly and repairs.

The present invention also eliminates the possibility of cable damage during handling and transport of the rollers. By recessing the male connector in the end of the stationary shaft, the connector is protected against the possibility of damage. There are no exposed wires which might be damaged.

The connector is hermetically sealed so that there is no chance for migration of oil from within the roller. The female connector also provides grounding and strain relief.

Other objects and advantages of the present invention will become apparent and obvious from a study of the following description and the accompanying drawings which are merely illustrative of such invention.

DETAILED DESCRIPTION OF THE INVENTION

Figure 1:
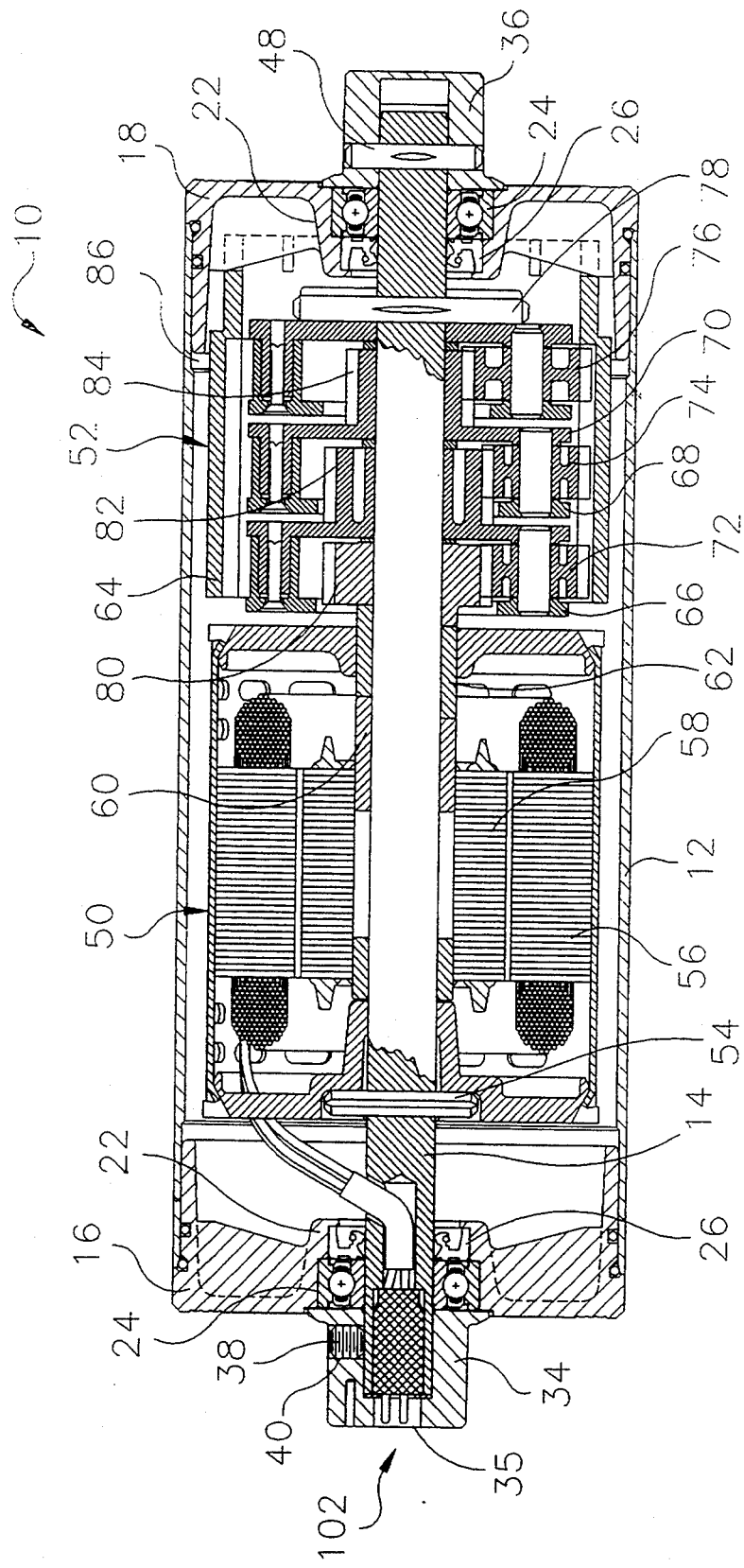
FIG. 1 is a longitudinal section view of the motorized roller of the present invention.

Referring now to the drawings,, and particularly to FIG. 1, there is shown a motorized pulley or roller indicated generally at 10 embodying the present invention. The motorized roller 10 is used in material-handling equipment such as conveyors, packaging machines, check-out counters, and cargo handling machinery. The motorized roller 10 can be used to drive conveyor belts on which goods are carried. Alternately, goods may be conveyed directly on the roller 10.

The motorized roller 10 includes a generally-cylindrical drum 12 which is rotatably mounted on a stationary roller shaft 14 by flanged endcaps 16 and 18. The endcaps 16 and 18 are press fit into respective ends of the drum 12. The endcaps 16 and 18 include a central hub 22 which contains an anti-friction bearing 24 and seal 26. The roller shaft 14 extends through the central hub 22 of each endcap 16 and 18. Shaft caps 34 and 36 are mounted on respective ends of the roller shaft 14. The shaft caps 34 and 36 function as adapters for mounting the roller 10 to the frame of a conveyor. Shaft cap 34 is secured to one end of the roller shaft 14 by means of a set screw 38 extending through a radial opening 40 in the shaft cap 34. Shaft cap 34 has a square opening 35 in the end thereof. The opposing shaft cap 36 is secured to the opposite end of the roller shaft 14 by a securing pin 48. Shaft cap 36 is closed on the end.

A drive assembly is disposed within the drum 12 for rotating the drum 12. The drive assembly includes a motor 50 and gear assembly 52. The motor 50 is fixed against rotation on the roller shaft 14 by a pin 54. The motor 50 is a conventional AC motor including a stator 56 and rotor 58. The rotor 58 rotates about the main shaft 14 on bushings 60. The motor output shaft 62 is engaged with the rotor bushings 60 and drives the gear assembly 52 which in turn rotates the drum 12 about the roller shaft 14.

The gear assembly 52 includes a three-stage planetary gear which drives a ring gear 64 fixed to the inner surface of the drum 12. The planetary gear includes three gear carriers 66, 68 and 70 (one for each stage) which are retained on the roller shaft 14 by a securing pin 78.

The gear carriers 66 and 68 freely rotate about the roller shaft 14. Gear carrier 70 is fixed to the roller shaft 14.

Each gear carrier 66, 68 and 70 carries three-equally spaced planetary gears 72, 74, and 76 respectively. The planetary gears 72, 74, and 76 are rotatably mounted on their respective gear carriers and are meshed with a ring gear 64. A first pinion gear 80 is rotatably mounted on the roller shaft 14 and is driven by the motor output shaft 62. The first pinion gear 80 meshes with the first-stage planetary gears 72. Thus, rotation of the first pinion gear 80 causes the planetary gears 72 to revolve around the roller shaft 14 and rotate the gear carrier 66.

The first stage gear carrier 66 includes an integrally-formed pinion gear 82 which meshes with the second stage planetary gears 74. Thus, as the gear carrier 66 rotates about the roller shaft 14, the second stage planetary gears 74 revolve about the roller shaft 14 and rotate the second stage gear carrier 68.

The second stage gear carrier 68 also includes an integrally-formed pinion gear 84 which meshes with the planetary gears 76 carried by the third stage gear carrier 70. Rotation of the second stage gear carrier 68 causes the planetary gears 76 to rotate. However, since the final gear carrier 70 is fixed to the roller shaft 14, the rotation of the third-stage planetary gears 75 causes the ring gear 64 to rotate. Since the ring gear 64 is fixed to the drum 12, the entire drum 12 is rotated about the main shaft 14.

Figure 2:
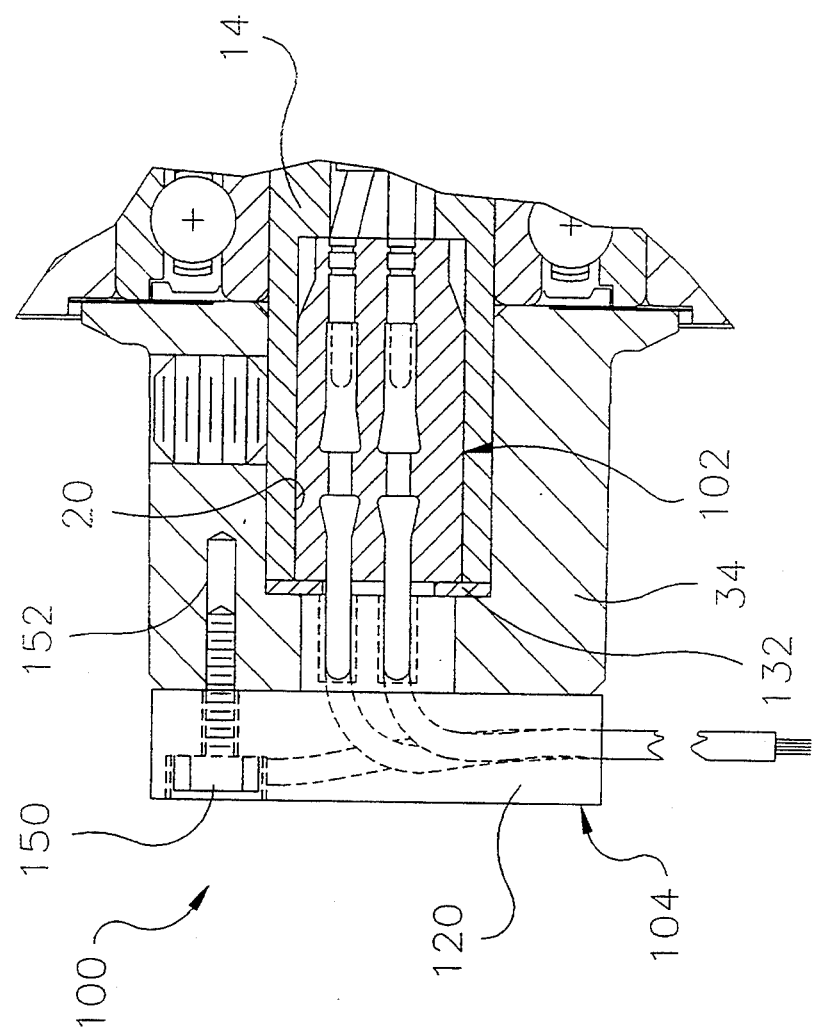
FIG. 2 is a detailed section view illustrating the integral male connector.
Figure 3:
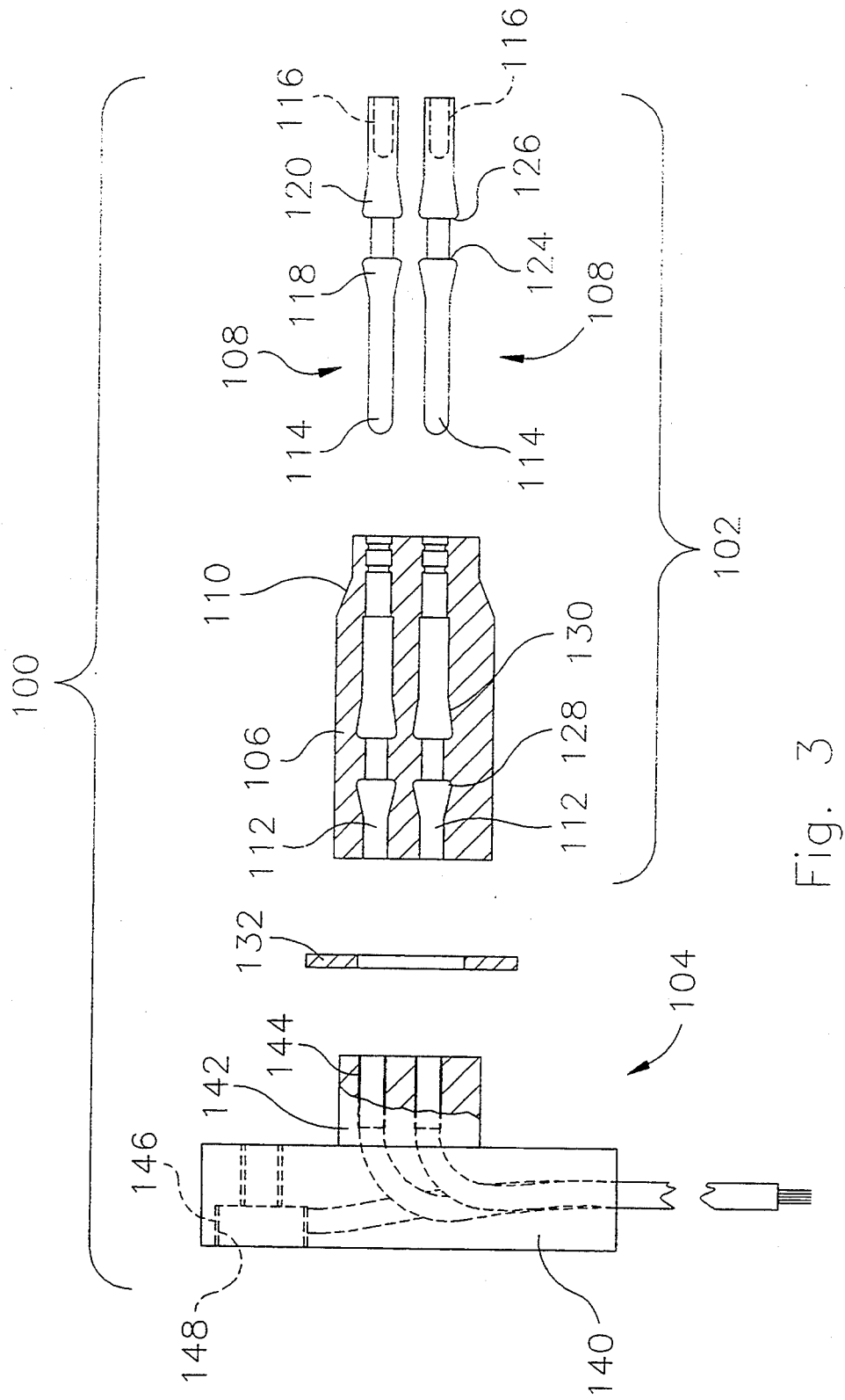
FIG. 3 is an exploded elevation view of the male and female connectors.

The drive assembly is powered from an external source. Power to the electric motor 50 is provided through a connector assembly 100 as shown in FIG. 2 and 3. The connector assembly 100 includes a male connector 102 and a female connector 104 which is adapted to mate with the male connector 102. The male connector 102 is recessed in a cavity 20 at one end of the roller shaft 14.

The male connector 102 comprises a plug body 106 made of rubber or neoprene and a plurality of contact pins 108. The plug body 106 has a generally cylindrical configuration with a bevelled insert end 110. Extending through the plug body 106 are a plurality of axial holes 112 for the contact pins 108. The axial holes 112 include a pair of annular recesses 128 and 130 for locking the contact pins 108 in place as hereinafter described.

The contact pins 108 include a rounded end 114. The opposite end includes a cavity 116 to receive the leads from, the electric motor 50. A pair of tapered flanges 118 and 120 are disposed along an intermediate portion of the contact pins 108. The tapered flanges 118 and 120 are joined by a connecting segment 122. The connecting segment 122 has a diameter slightly smaller than the diameter of the end portions of the contact pin 108. The junction of the tapered flanges 118 and 120 with the connecting segment 122 defines a pair of stops 124 and 126. The purpose of these stops 124 and 126 is to prevent axial movement of the contact pin 108 within the plug body 106.

The contact pins 108 are received in the axial holes 112 such that the tapered flanges 118 and 120 interlock with the annular recesses 128 and 130 in the axial holes 112. The tapered surface of the flanges 1 ! 8 and 120 facilitate the insertion of the contact pins 108 into the plug body 106. The plug body 106 expands slightly as the contact pins 108 are inserted into the plug body 106 allowing passage of the contact pins 108. Once the tapered flanges 118 and 120 reach the tapered cavities 128 and 130, the plug body 106 returns to its natural shape to effectively lock the contact pins 108 within the plug body 106. The stops 124 and 126 of the contact pins 108 prevent axial movement of the contact pins 108 in either direction.

The plug body 106 fits into an opening 20 in the end of the roller shaft 14. The outside diameter of the plug body 106 is slightly larger than the opening 20 in the roller shaft 14 to provide an interference fit. The bevelled insert end 110 allows the plug body 106 to be inserted into the opening in the roller shaft 14. As the plug body 106 is pressed into the end of the roller shaft 14, the plug body 106 is compressed to form a tight, leak-proof seal. Thus, oil contained within the roller tube or drum 12 is prevented from migrating through the opening 20 in the roller shaft 14. The plug body 106 is retained in the end of the roller shaft 14 by a washer 132.

Figure 4:
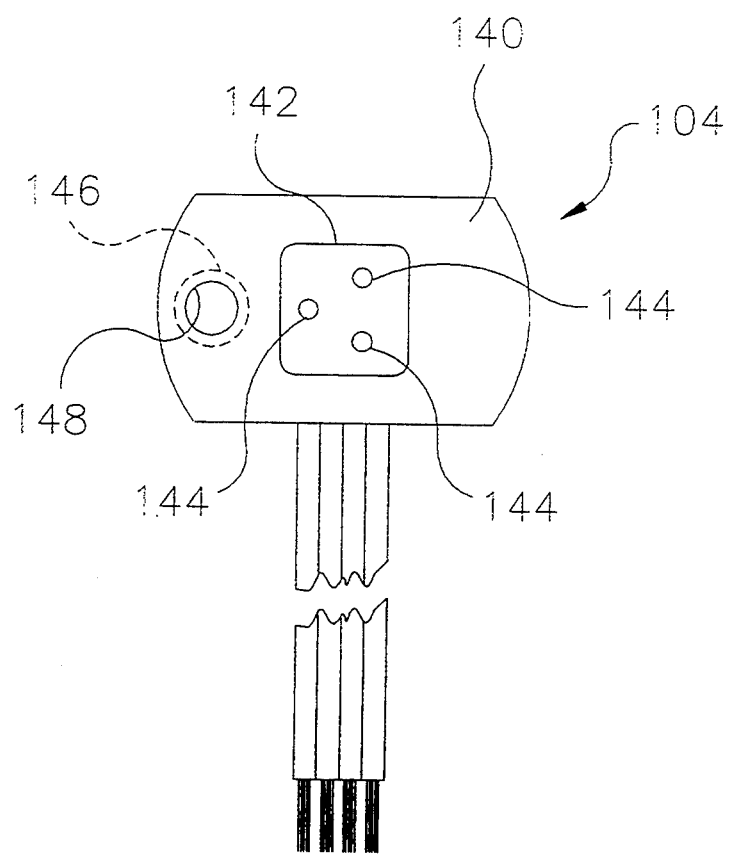
FIG. 4 is a front elevation view of the female connector.

The female connector 104 is shown best in FIGS. 3 and 4. The female connector 104 includes a main body 140 having a generally square insert portion 142. The insert portion 142 registers with the square opening 35 in the shaft cap 34. The insert portion 142 includes a series of female contacts 144 which engage with the male contacts 108.

A bolt hole 146 extends through the female connector 104. A securing screw 150 is inserted through the bolt hole 146 in the female connector 104 and threadably engages a corresponding opening 152 in the shaft cap 34 to make a secure connection. A brass rivet 148 is disposed in the bolt hole 146. The bass rivet 148 is connected to the ground lead of the female connector 104. Thus, when the screw 150 is inserted, the motorized pulley is automatically grounded.

The connector assembly 100 is specifically designed so that only one connection between the male and female connectors 102 and 104 is possible. Polarization of the connector assembly 100 can be accomplished through a polygonal configuration applied to one of the connectors, by arranging the contacts of the connectors, or a combination of these approaches. In the disclosed embodiment, the insert portion 142 of the female connector 104 has a square configuration which registers with the square opening 35 in the shaft cap 34. In addition, the contacts of the male and female connectors 102 and 104 are arranged in a triangular configuration. The shape of the insert portion 142 in combination with the triangular arrangement of the contacts effectively polarizes the connector assembly 100.

In use, the female connectors 104 are wired with the power supply by trained personnel. Once the female connectors 104 are wired in place, the motorized roller 10 can be installed by untrained personnel. The motorized rollers 10 are electrically connected simply by plugging the female connector 104 into the integral male connector 102 in the end of the roller shaft 14. After the female connector 104 is plugged into the male connector 102, the securing screw 150 is inserted into the bolt hole 146 in the female connector 104 and is threadably engaged with the opening 152 in the shaft cap 134. The screw 150 provides a ground for the motorized roller 10.

If the motorized roller 10 fails or needs replacement, the screw 150 securing the female connector 104 is removed and the female connector 104 is unplugged with respect to the male connector 102. After the motorized roller 10 is replaced, the female connector 104 is plugged into the new motorized roller 10 and resecured by inserting screw 150. Thus, the connector 100 provides for easy and quick replacement of damaged or worn rollers 10.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A motorized pulley or roller comprising:
   (a) a stationary roller shaft;
   (b) a generally cylindrical drum mounted on the roller shaft for rotation around the axis of the roller shaft;
   (c) an electric drive assembly mounted on the roller shaft and disposed inside the cylindrical drum from rotating the drum about the roller shaft;
   (d) a recess formed in one end of the roller shaft;
   (e) a first electrical connector disposed in the recess in the end of the roller shaft and electrically connected to the electric drive assembly; and
   (f) a second electrical connector operatively connected to a power source and shaped to mate with said first connector to provide power to said electric drive assembly when the first and second connectors are mated.

2. The motorized roller of claim 1 wherein the first electrical connector is a male connector and the second electrical connector is a female connector.

3. The motorized roller of claim 2 wherein the first electrical connector comprises a generally cylindrical plug body having a plurality of axial holes and a plurality of contact pins extending through the axial holes of the plug body.

4. The motorized roller of claim 3 wherein the contact pins include a pair of oppositely directed radially extending flanges along an intermediate portion thereof, and wherein the plug body includes means for interlocking with the flanges of the contact pins to prevent axial movement of the contact pins in either direction.

5. The motorized roller of claim 4 wherein the interlocking means in the plug body comprises a pair of oppositely directed annular recesses along the length of the axial holes in the plug body which are adapted to receive oppositely directed the flanges of the contact pins.

6. The motorized roller of claim 5 wherein the oppositely directed flanges of the contact pins each include a tapered surface sloping toward a respective end of the contact pin to facilitate insertion of the contact pin into the axial hole of the plug body from either direction.

7. The motorized roller of claim 2 wherein the plug body is made of a resilient, non-conductive material.

8. The motorized roller of claim 7 wherein the plug body is sized slightly larger than the recess in the roller shaft so that the plug body is compressed upon insertion into the recess in the roller shaft.

9. The motorized roller of claim 8 wherein the plug body includes a bevelled insert end to facilitate insertion of the plug body into the recess in the roller shaft.

10. The motorized roller of claim 3 wherein the contact pins are recessed below the end of the roller shaft.

11. The motorized roller of claim 2 wherein the female connector includes a bolt hole for securing the female connector to the roller shaft.

12. The motorized roller of claim 11 wherein the bolt hole includes an electrically conductive bushing for grounding the electric motor when the securing screw is inserted therein.

13. The motorized roller of claim 2 wherein at least one of the male and female connectors includes means for polarizing the connector.

14. The motorized roller of claim 13 wherein one of the male and female connectors has a polygonal configuration for polarizing the connectors.

15. The motorized roller of claim 13 wherein the male and female connectors include a polarizing arrangement of the electrical contacts.

* * * * *